(12) United States Patent
Tenghamn et al.

(10) Patent No.: US 7,239,577 B2
(45) Date of Patent: Jul. 3, 2007

(54) APPARATUS AND METHODS FOR MULTICOMPONENT MARINE GEOPHYSICAL DATA GATHERING

(75) Inventors: Stig Rune Lennart Tenghamn, Katy, TX (US); Audun Sødal, Ranheim (NO); Andre Stenzel, Richmond, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 10/233,266

(22) Filed: Aug. 30, 2002

(65) Prior Publication Data

US 2004/0042341 A1    Mar. 4, 2004

(51) Int. Cl.
*G01V 1/38* (2006.01)
(52) U.S. Cl. ............... 367/15; 367/149; 367/152; 367/171; 367/20; 174/101.5
(58) Field of Classification Search ............... 367/15, 367/24, 141, 16, 20, 149, 152, 171; 174/101.5
See application file for complete search history.

(56) References Cited

U.S. PATENT DOCUMENTS

| | | | |
|---|---|---|---|
| 3,283,293 A | | 11/1966 | Pavey, Jr. et al. |
| 3,696,329 A | * | 10/1972 | Hazelhurst ............... 367/154 |
| 4,477,887 A | * | 10/1984 | Berni ............... 367/20 |
| 4,486,865 A | | 12/1984 | Ruehle |
| 4,520,467 A | * | 5/1985 | Berni ............... 367/24 |
| 4,618,949 A | | 10/1986 | Lister |
| 4,752,916 A | * | 6/1988 | Loewenthal ............... 367/24 |
| 4,789,971 A | * | 12/1988 | Powers et al. ............... 367/152 |
| 4,935,903 A | | 6/1990 | Sanders et al. |
| 4,979,150 A | * | 12/1990 | Barr ............... 367/24 |

(Continued)

FOREIGN PATENT DOCUMENTS

EP         0 089 700         9/1983

(Continued)

OTHER PUBLICATIONS

Elert, Glenn. The Physics Factbook. Website edition.*

(Continued)

*Primary Examiner*—Jack Keith
*Assistant Examiner*—Scott A. Hughes
(74) *Attorney, Agent, or Firm*—E. Eugene Thigpen; Richard A. Fagin

(57) ABSTRACT

In one embodiment the invention comprises a particle velocity sensor that includes a housing with a geophone mounted in the housing. A fluid that substantially surrounds the geophone is included within the housing. The particle velocity sensor has an acoustic impedance within the range of about 750,000 Newton seconds per cubic meter (Ns/m$^3$) to about 3,000,000 Newton seconds per cubic meter (Ns/m$^3$). In another embodiment the invention comprises method of geophysical exploration in which a seismic signal is generated in a body of water and detected with a plurality of co-located particle velocity sensors and pressure gradient sensors positioned within a seismic cable. The output signal of either or both of the particle velocity sensors or the pressure gradient sensors is modified to substantially equalize the output signals from the particle velocity sensors and the pressure gradient sensors. The output signals from particle velocity sensors and pressure gradient sensors are then combined.

18 Claims, 9 Drawing Sheets

U.S. PATENT DOCUMENTS

| | | | |
|---|---|---|---|
| 5,189,642 A * | 2/1993 | Donoho et al. | 367/15 |
| 5,235,554 A | 8/1993 | Barr et al. | |
| 5,384,753 A * | 1/1995 | Sanders | 367/163 |
| 5,408,440 A | 4/1995 | Badger | |
| 5,475,652 A * | 12/1995 | McNeel et al. | 367/188 |
| 5,621,700 A | 4/1997 | Moldoveanu | |
| 5,774,417 A | 6/1998 | Corrigan et al. | |
| 5,777,954 A | 7/1998 | Hepp | |
| 6,048,522 A * | 4/2000 | Plochocka et al. | 424/78.24 |
| 6,061,302 A * | 5/2000 | Brink et al. | 367/188 |
| 6,172,940 B1 * | 1/2001 | McConnell et al. | 367/178 |
| 6,201,764 B1 | 3/2001 | Rice et al. | |
| 6,512,980 B1 * | 1/2003 | Barr | 367/159 |
| 6,607,050 B2 * | 8/2003 | He et al. | 181/110 |
| 7,068,568 B2 * | 6/2006 | Robertsson | 367/24 |

FOREIGN PATENT DOCUMENTS

| | | |
|---|---|---|
| EP | 0 460 789 | 11/1991 |
| EP | 0 782 011 | 1/1999 |
| EP | 0 907 087 | 7/2000 |
| GB | 2 375 606 | 11/2002 |
| GB | 2 384 068 | 7/2003 |
| WO | WO 95/04945 | 2/1995 |

OTHER PUBLICATIONS

Peter Maxwell, Jon Tessman, Bruce Reichert, "Design through to production of a MEMS digital accelerometer for seismic acquisition", EAGE First Break, Mar. 2001, pp. 141-143, vol. 19.3.

* cited by examiner

APPARATUS AND METHODS FOR MULTICOMPONENT MARINE GEOPHYSICAL DATA GATHERING

BACKGROUND OF THE INVENTION

1. Field of the Invention

The present invention is related to marine geophysical exploration. More specifically, the invention is related to sensors for detecting seismic signals and to marine seismic data gathering.

2. Description of Relevant Art

In seismic exploration, geophysical data are obtained by applying acoustic energy to the earth at the surface and detecting seismic energy reflected from interfaces between different layers in subsurface formations. The seismic wave is reflected when there is a difference in impedance between the layer above the interface and the layer below the interface.

In marine seismic exploration, a seismic shock generator, such as an airgun, for example, is commonly used to generate an acoustic pulse. The resulting seismic wave is reflected back from subsurface interfaces and detected by sensors deployed in the water or on the water bottom.

In a typical marine seismic operation, a streamer cable is towed behind an exploration vessel at a water depth between about six to about nine meters. Hydrophones are included in the streamer cable for detecting seismic signals. A hydrophone is a submersible pressure gradient sensor that converts pressure waves into electrical signals that are typically recorded for signal processing, and evaluated to estimate characteristics of the earth's subsurface.

After the reflected wave reaches the streamer cable, the wave continues to propagate to the water/air interface at the water surface, from which the wave is reflected downwardly, and is again detected by the hydrophones in the streamer cable. The reflection coefficient at the surface is nearly unity in magnitude and negative in sign. The seismic wave will be phase-shifted 180 degrees. The downwardly traveling wave is commonly referred to as the "ghost" signal, and the presence of this ghost reflection creates a spectral notch in the detected signal. Because of the spectral notch, some frequencies in the detected signal are amplified and some frequencies are attenuated.

Because of the ghost reflection, the water surface acts like a filter, making it difficult to record data outside a selected bandwidth without excessive attenuation or notches in the recorded data.

Maximum attenuation will occur at frequencies for which the distance between the detecting hydrophone and the water surface is equal to one-half wavelength. Maximum amplification will occur at frequencies for which the distance between the detecting hydrophone and the water surface is one-quarter wavelength. The wavelength of the acoustic wave is equal to the velocity divided by the frequency, and the velocity of an acoustic wave in water is about 1500 meters per second. Accordingly the location in the frequency spectrum of the resulting spectral notch is readily determinable. For example, for a streamer water depth of 7 meters, as illustrated by curve 54 in FIG. 1, maximum attenuation will occur at a frequency of about 107 Hz. and maximum amplification will occur at a frequency of about 54 Hz.

It has not been practical to tow cables deeper than about 9 meters because the location of the spectral notch in the frequency spectrum of the signal detected by a hydrophone substantially diminishes the utility of the recorded data. It has also not been practical to tow cables at a depth shallower than about 6 meters, because the ghost signal reflected from the water surface substantially attenuates the signal detected by a hydrophone within the frequency band of interest.

It is also common to perform marine seismic operations in which sensors are deployed on the water bottom. Such operations are typically referred to as "ocean bottom seismic" operations. In ocean bottom seismic operations, both hydrophones and geophones are employed for recording the seismic data, with the geophone normally being placed in direct contact with the ocean bottom. To improve the contact between the geophone and the ocean floor, the geophone assembly is typically made to be quite heavy, with a typical density of between 3 and 7 grams per cubic centimeter.

A geophone detects a particle velocity signal, whereas the hydrophone detects a pressure gradient signal. The geophone has directional sensitivity, whereas the hydrophone does not. Accordingly, the upgoing wavefield signals detected by the geophone and the hydrophone will be in phase, but the downgoing wavefield signals detected by the geophone and the hydrophone will be 180 degrees out of phase. Various techniques have been proposed for using this phase difference to reduce the spectral notch caused by the ghost reflection.

U.S. Pat. No. 4,486,865 to Ruehle, for example, teaches a system said to suppress ghost reflections by combining the outputs of pressure and velocity detectors. The detectors are paired, one pressure detector and one velocity detector in each pair. A filter is said to change the frequency content of at least one of the detectors so that the ghost reflections cancel when the outputs are combined.

U.S. Pat. No. 5,621,700 to Moldovenu also teaches using at least one sensor pair comprising a pressure sensor and a velocity sensor in an ocean bottom cable in a method for attenuating ghosts and water layer reverberations.

U.S. Pat. No. 4,935,903 to Sanders et al. teaches a marine seismic reflection prospecting system that detects seismic waves traveling in water by pressure sensor-particle velocity sensor pairs (e.g., hydrophone-geophone pairs) or alternatively vertically-spaced pressure sensors. Instead of filtering to eliminate ghost reflection data, the system calls for enhancing primary reflection data for use in pre-stack processing by adding the ghost data.

U.S. Pat. No. 4,979,150 provides a method for marine seismic prospecting said to attenuate coherent noise resulting from water column reverberation by applying a scale factor to the output of a pressure transducer and a particle velocity transducer positioned substantially adjacent one another in the water. In this method, the transducers may be positioned either on the ocean bottom or at a location in the water above the bottom, although the ocean bottom is said to be preferred.

Four component system have also been utilized on the sea floor. A four component system utilizes a hydrophone for detecting a pressure signal, together with a three-component geophone for detecting particle velocity signals in three orthogonal directions: vertical, in-line and cross line. The vertical geophone output signal is used in conjunction with the hydrophone signal to compensate for the surface reflection. The three orthogonally positioned geophones are used for detecting shear waves, including the propagation direction of the shear waves.

The utility of simultaneously recording pressure and vertical particle motion in marine seismic operations has long been recognized. However, a geophone (or accelerometer) for measuring vertical particle motion must be maintained in a proper orientation in order to accurately detect the signal. Maintaining such orientation is non-trivial in a marine streamer and significantly more problematic than maintaining such orientation on the ocean bottom. Exploration streamers towed behind marine vessels are typically over one mile in length. Modern marine seismic streamers may use more than 10,000 transducers. To maintain a particle velocity sensor (a geophone or accelerometer) in proper orientation to detect vertical motion, the prior art has proposed various solutions. The use of gimbals has been proposed repeatedly. One example is a "gimbal lock system for seismic sensors" described in U.S. Pat. No. 6,061,302 to Brink et al. Another example is a "dual gimbal geophone" described in U.S. Pat. No. 5,475,652 to McNeel et al. Still another example is a "self-orienting directionally sensitive geophone" described in U.S. Pat. No. 4,618,949 to Lister. Nevertheless, no streamers containing both hydrophone and geophones are in commercial use.

In addition to the problem of maintaining orientation, severe noise from streamer cables has been considered prohibitive to use of particle velocity sensors in streamers. Because the voltage output signal from particle velocity sensors is normally not as strong as the output signal from hydrophones, the noise level in streamer cables has been a detriment to the use of particle velocity sensors.

In ocean bottom cables, the sensors are located on the sea floor and therefore are less exposed to noise generated by vibrations in the cable. Geophones are typically gimbaled to ensure a correct direction and are made of heavy brass or similar material to ensure good contact with the sea floor. The geophone housing is typically filled with fluid to improve the coupling between the sensor and the seafloor. However, because of the variation in properties of the seafloor from location to location, impedance mismatch between the seafloor and the sensor and sensor housing can cause problems. Such mismatch in impedance can cause various types of distortion in both the hydrophone signal and the geophone signal. Also, the boundary effects for the hydrophone and the geophone due to their closeness to the sea floor can change the response for the hydrophone and the geophone, giving rise to a need to correct the amplitude values in processing to be able to use the signal for elimination of the surface "ghost" reflection.

Accordingly a need continues to exist for an improved system for gathering marine seismic data.

SUMMARY OF THE INVENTION

In one embodiment the invention comprises a particle velocity sensor that includes a housing with a geophone mounted in the housing. A fluid that substantially surrounds the geophone is included within the housing. The particle velocity sensor has an acoustic impedance within the range of about 750,000 Newton seconds per cubic meter (Ns/m$^3$) to about 3,000,000 Newton seconds per cubic meter (Ns/m$^3$).

In another embodiment the invention comprises method of geophysical exploration in which a seismic signal is generated in a body of water and detected with a plurality of co-located particle velocity sensors and pressure gradient sensors positioned within a seismic cable deployed in the body of water. The output signal of either or both of the particle velocity sensors or the pressure gradient sensors is modified to substantially equalize the output signals from the particle velocity sensors and the pressure gradient sensors within at least a selected frequency range. The output signals from co-located particle velocity sensors and pressure gradient sensors are then combined.

In yet another embodiment the invention comprises a method of processing marine seismic data to reduce spectral notches resulting from surface ghost reflections in which the amplitude and phase variation with frequency of the output of a particle velocity sensor of a co-located particle velocity sensor and pressure gradient sensor pair is determined independently of any variation in amplitude or phase with frequency of the particle velocity sensor output resulting from impedance mismatch between the particle velocity sensor and a medium from which a seismic wave is coupled to the particle velocity sensor. The output signal of one or both of the particle velocity sensors or pressure gradient sensors is modified to compensate for the determined amplitude and phase variation to generate modified output signals. The modified output signals are then summed.

DESCRIPTION OF PREFERRED EMBODIMENTS

Figure 1:
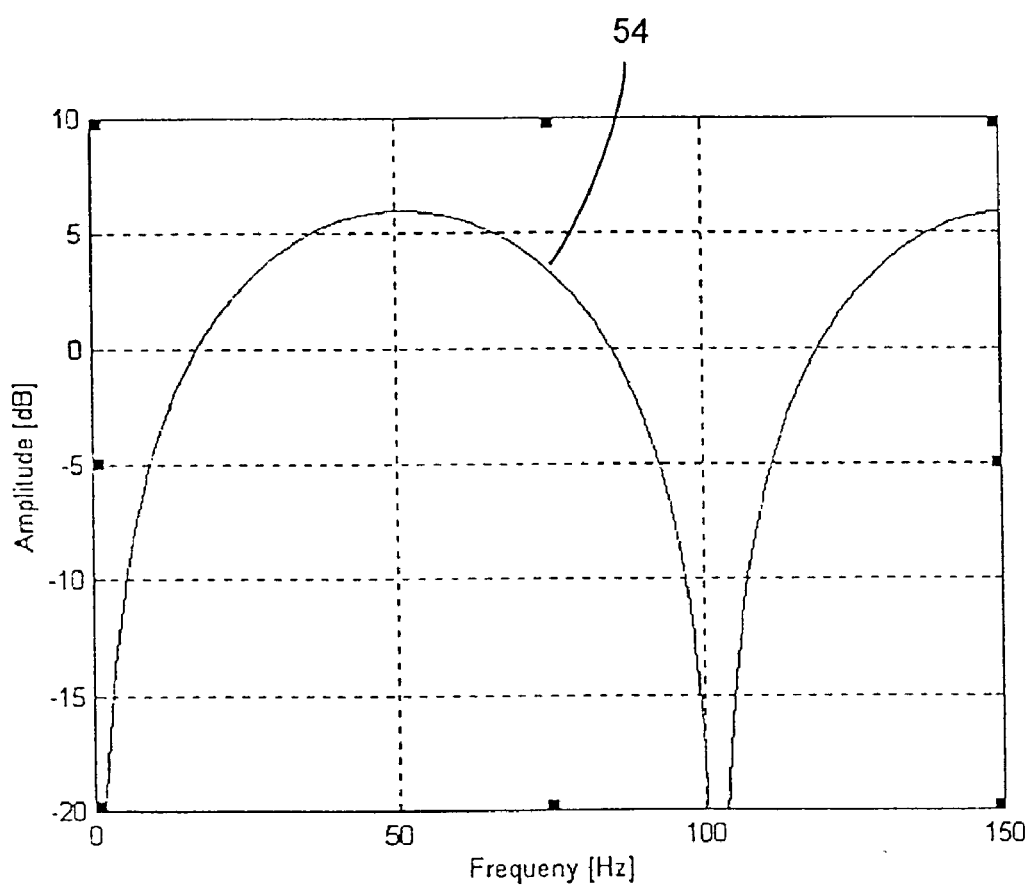
FIG. 1 shows the frequency spectrum of a seismic signal detected by a hydrophone at a water depth of 7 meters.
Figure 2:
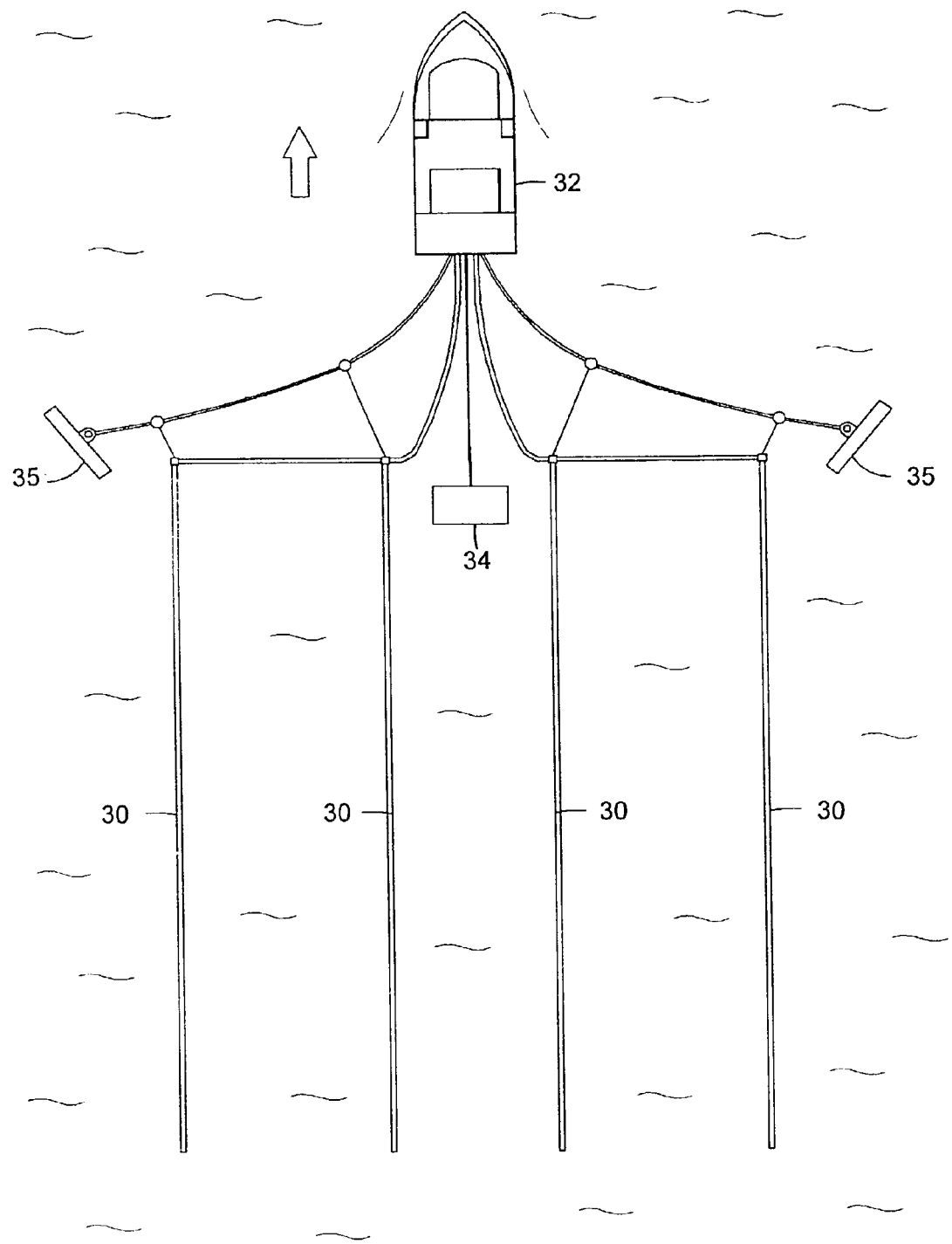
FIG. 2 illustrates a typical implementation of the invention, in which a plurality of streamer cables are towed behind a seismic survey vessel.

FIG. 2 illustrates a typical geophysical exploration configuration in which a plurality of streamer cables 30 are towed behind vessel 32. One or more seismic sources 34 are also normally towed behind the vessel. The seismic source, which typically is an airgun, but may also be a water gun or other type of source known to those of ordinary skill in the art, transmits seismic energy or waves into the earth and the waves are reflected back by reflectors in the earth and recorded by sensors in the streamers. Paravanes 35 are utilized to maintain the cables 30 in the desired lateral position. The invention may also be implemented, however, in seismic cables that are maintained at a substantially stationary position in a body of water, either floating at a selected depth or lying on the bottom of the body of water, in which case the source may be towed behind a vessel to generate shock waves at varying locations, or the source may also be maintained in a stationary position. Seismic sensors, in accordance with embodiments of the present invention are deployed in streamer cables, such as cables 30.

Figure 3:
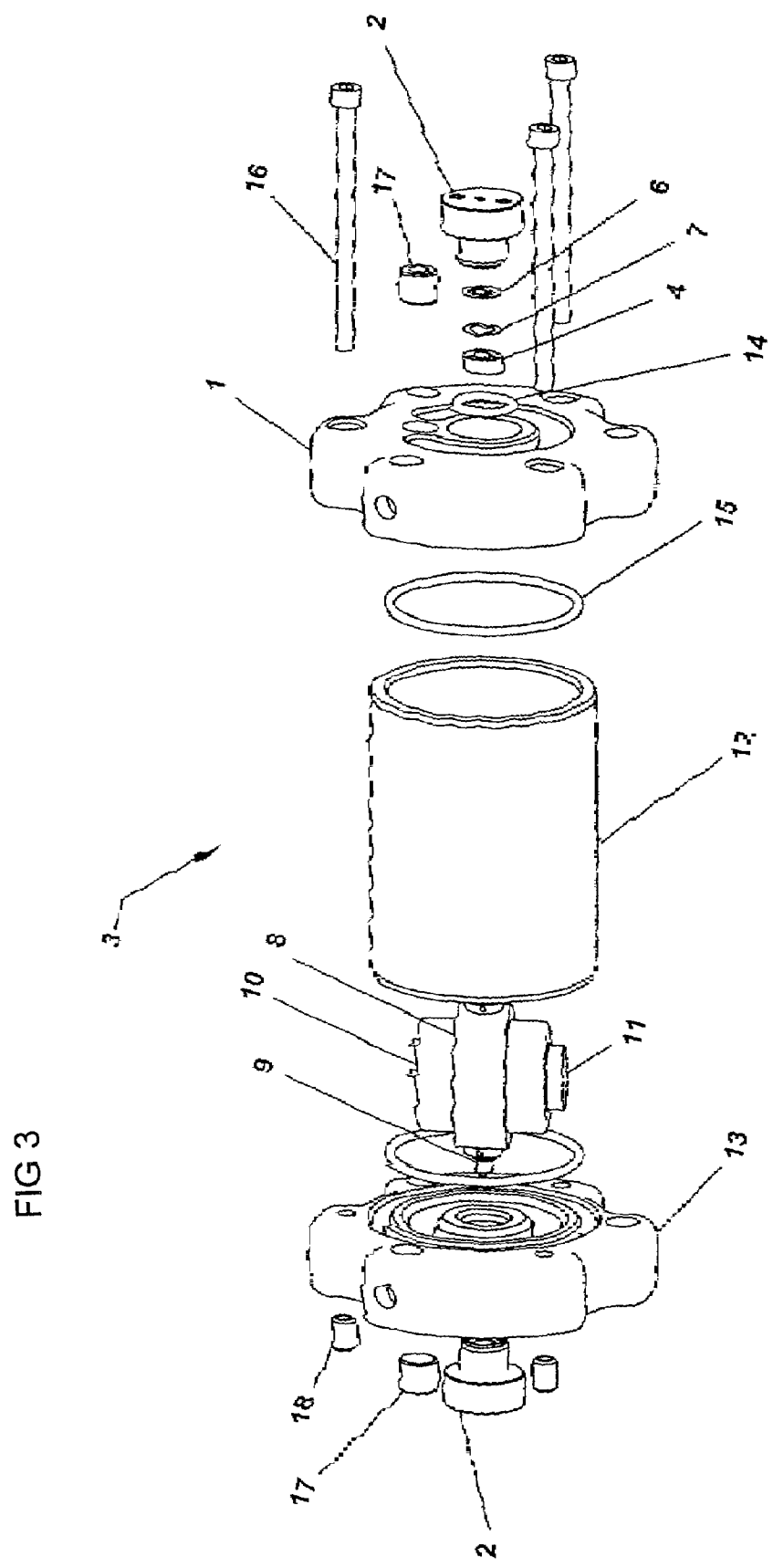
FIG. 3 shows the geophone assembly with the parts exploded or separated out for illustration.
Figure 4:
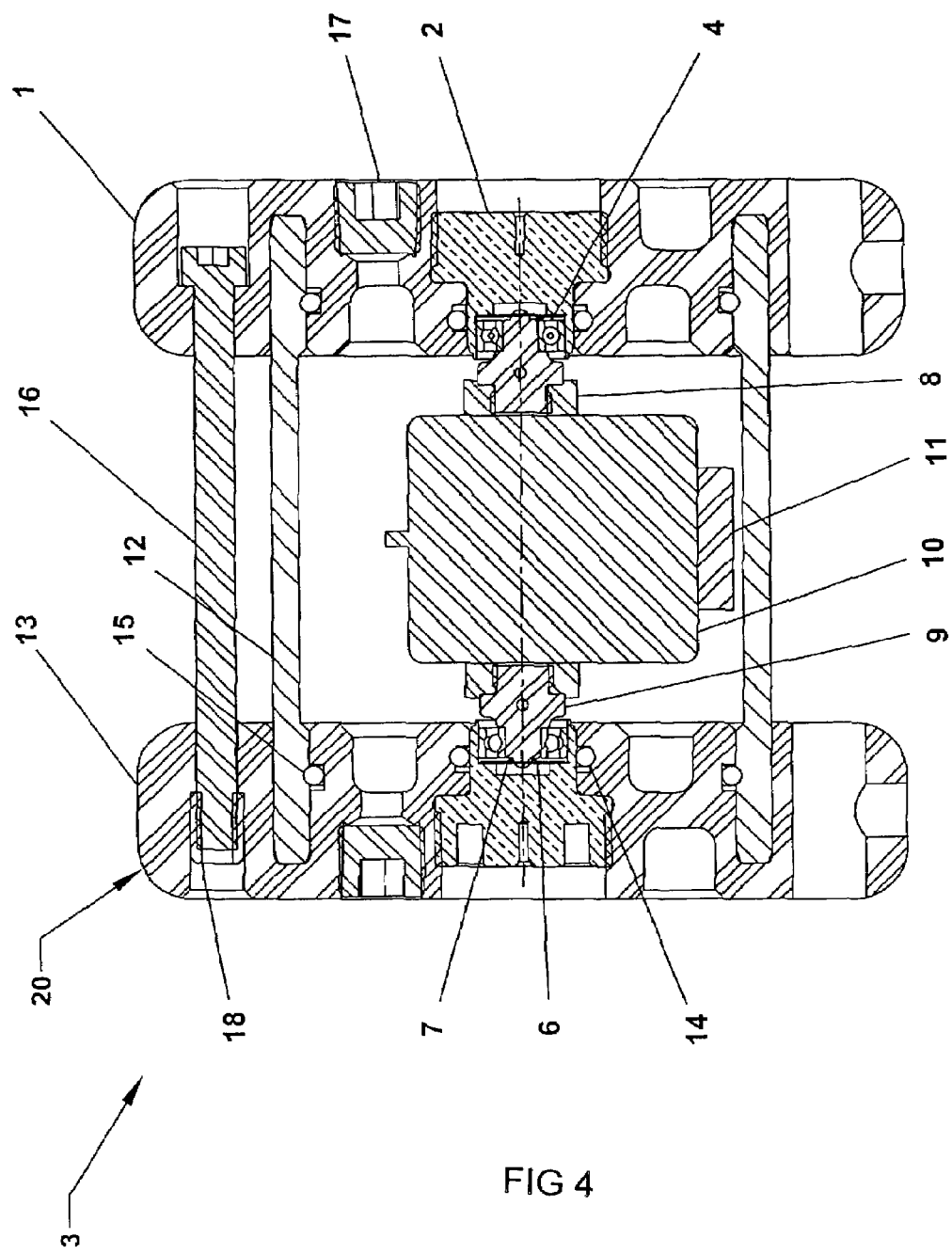
FIG. 4 shows a cross section of a geophone assembly.

In a particular implementation, the present invention comprises a particle velocity sensor in the form of a geophone assembly. Such a geophone assembly is shown in FIGS. 3 and 4. FIG. 3 shows the geophone assembly 3 with the parts exploded or separated out for illustration. FIG. 4 shows a cross section of the geophone assembly 3 of FIG. 3 with the various parts assembled (not exploded).

With reference to FIGS. 3 and 4, geophone 10 is mounted in a housing 20 comprising outer sleeve 12 and end cups 1 and 13. Geophone 10 is secured in mounting ring (or cradle) 8. Shafts 9 extend from opposite sides of mounting ring 10 into bushings 2. Bearings 4, which are positioned between shafts 9 and bushings 2 enable rotational motion of shafts 9 with respect to bushings 2, thereby providing a gimbaled mounting. End caps 1 and 13 are secured together by means of bolts 16 and threaded inserts 18. Spring 6 provides electrical contact between shafts 9, which are electrically conductive and are electrically connected to output terminals (not shown) of the geophone, and bushings 2, which are also electrically conductive, and which are electrically connected to the streamer cable wiring. Thrust washers 7 provide pre-load for bearings 4 to eliminate undesired bearing slack. O-rings 15 provide a seal between outer sleeve 12 and end caps 1 and 13, and O-rings 14 provide a seal between bushings 2 and end caps 1 and 13. Plug 17 is utilized for plugging the conduit through which fluid is inserted into the interior of the geophone housing comprising the two end caps 1 and 13, and the outer sleeve 12. The configuration of the geophone assembly illustrated in FIGS. 3 and 4 is a particular implementation of an embodiment of the invention is not intended to be limiting. The geophone assembly 3 is secured to a seismic cable strain member for positive location.

The housing 20, comprising end caps 1 and 13 and outer sleeve 12, contains a fluid, preferably an oil, which substantially surrounds the geophone. The fluid provides coupling between the geophone and the geophone housing of the geophone assembly. The fluid should preferably surround the geophone, but preferably will not entirely fill the housing so as to allow room for fluid expansion and contraction with changes in temperature and pressure. The fluid has a viscosity that provides sufficient damping of geophone movement to reduce noise, while enabling sufficient movement of the geophone 10 on the bearings to maintain the transducer in the desired orientation. That is, the viscosity of the fluid should be high enough to restrain the geophone from unwanted movements but low enough to prevent the geophone from following rotational movement of the housing and a streamer in which the geophone assembly may be mounted. A preferred viscosity for such fluid is in the range of about 500 to about 5000 centistokes.

A positioner, such as a weight 11, may be mounted on the lower side of the geophone 10 to assist in maintaining the sensor 10 in the desired orientation. Positioner 11 may be formed substantially from lead, although other materials having a density greater than the density of the geophone may be utilized. Alternatively, or additionally, a positioner (not shown) having a density lower than the density of the fluid that substantially surrounds the geophone 10, may be installed on the upper side of geophone 10 to assist in maintaining the geophone 10 in the desired orientation. Locating the center of gravity of the geophone below the rotational axis of the gimbal on which the sensor is mounted will also assist in maintaining the geophone in the desired orientation.

The particle velocity sensor in accordance with this invention is sufficiently small to fit in the interior of a cylindrical streamer cable. Typical internal diameters of such cylindrical streamer cables are either 55 millimeters or 66 millimeters. The space within the streamer surrounding the seismic sensors and other apparatus (not shown) positioned within the streamer is typically filled with a liquid, such as an oil, which provides substantially neutral buoyancy to the cable. The space may also be filled with a gel or semi-solid material, and the streamer may also be a solid streamer.

In a preferred embodiment of the invention, the density of the overall geophone assembly (including the fluid and all other elements thereof) is selected to improve coupling between the geophone assembly and its surroundings. In general, optimum coupling is obtained when the acoustic impedance of the geophone assembly is about the same as the acoustic impedance of its surroundings, which may be achieved by making the density of the geophone assembly about the same as the density of its surroundings, and the acoustic velocity of the geophone assembly about the same as the acoustic velocity of its surroundings.

When an acoustic wave traveling in one medium encounters the boundary of a second medium, reflected and transmitted waves are generated. Further, when the boundary area of the second medium is much smaller than the wavelength of the acoustic wave, diffraction results rather than reflection. For plane waves the characteristic acoustic impedance of a medium is equal to density times velocity, i.e., $$z = \pm \rho_0 c \qquad \text{(Eq. 1)}$$

in which, z=acoustic impedance
$\rho_0$=density, and
c=velocity.

Let the incident and reflected wave travel in a fluid of characteristic acoustic impedance, $r_1 = \rho_1 c_1$, where $\rho_1$ is equilibrium density of the fluid and $c_1$ is the phase speed in the fluid.

Let the transmitted wave travel in a fluid of characteristic acoustic impedance $r_2 = \rho_2 c_2$. If the complex pressure amplitude of the incident wave is $P_1$, that of the reflected wave $P_R$, and that of the transmitted wave $P_T$, then the pressure reflection coefficient R may be defined as:

$$R = \frac{r_2 - r_1}{r_2 + r_1}, \qquad \text{(Eq. 2)}$$

and since 1+R=T, the pressure transmission coefficient T can be written as:

$$T = \frac{2r_2}{r_2 + r_1} \qquad \text{(Eq. 3)}$$

It follows from the foregoing explanation that improved reception will be achieved if the particle velocity sensor is made in such a way that the density and speed in the sensor assembly, including its housing and other components, is similar to that of the surrounding fluid. If they are equal, the reflection coefficient will be R=0 and the transmission coefficient will be T=1.

By making the acoustic velocity in the particle velocity sensor substantially equal to the acoustic velocity in the water in which the sensor is deployed, and by making the density of the particle velocity sensor similar to the density of the water, a good impedance match is generated between the water and the particle velocity sensor. The velocity sensor will have a good impedance match with the surrounding media and no distortion of amplitude or phase will occur due to reflection, diffraction or other anomalies of the traveling wave passing through the sensor and its housing.

In a preferred embodiment, the density of the particle velocity sensor is less than about twice the density of water (about 2 g/cm$^3$), and more preferably about the same as the density of water (about 1 g/cm$^3$). Accordingly, the density of the particle velocity sensor should typically be between about 0.5 g/cm$^3$ and 2 g/cm$^3$, and more preferably, about 1.0 g/cm$^3$. It is understood, however, that water density may vary with salinity, and that it may be useful to vary the density of the particle velocity sensor, depending on the particular body of water in which the particle velocity sensor is to be employed. Because the density of particle velocity sensor in accordance with a preferred embodiment of the invention is substantially less than the density of geophone assemblies typically available for use in ocean bottom seismic operations, different components are selected from which to assemble the geophone assembly. For example, at least a portion of the housing may be formed from a moldable elastomeric, such as isoplast or polypropylene, or a moldable composite material, such as fiber reinforced epoxy.

Over and above the need for good acoustic coupling, a low-weight particle velocity sensor is useful because, in a preferred embodiment of the invention, the seismic cable in which the sensors are included needs to be neutrally buoyant. As many as 10,000 particle velocity sensors may be utilized in a single cable. Accordingly, a particle velocity sensor having a density of less than 2 grams per cubic centimeter facilitates the mechanical construction of the seismic cable to achieve neutral buoyancy.

Figure 5:
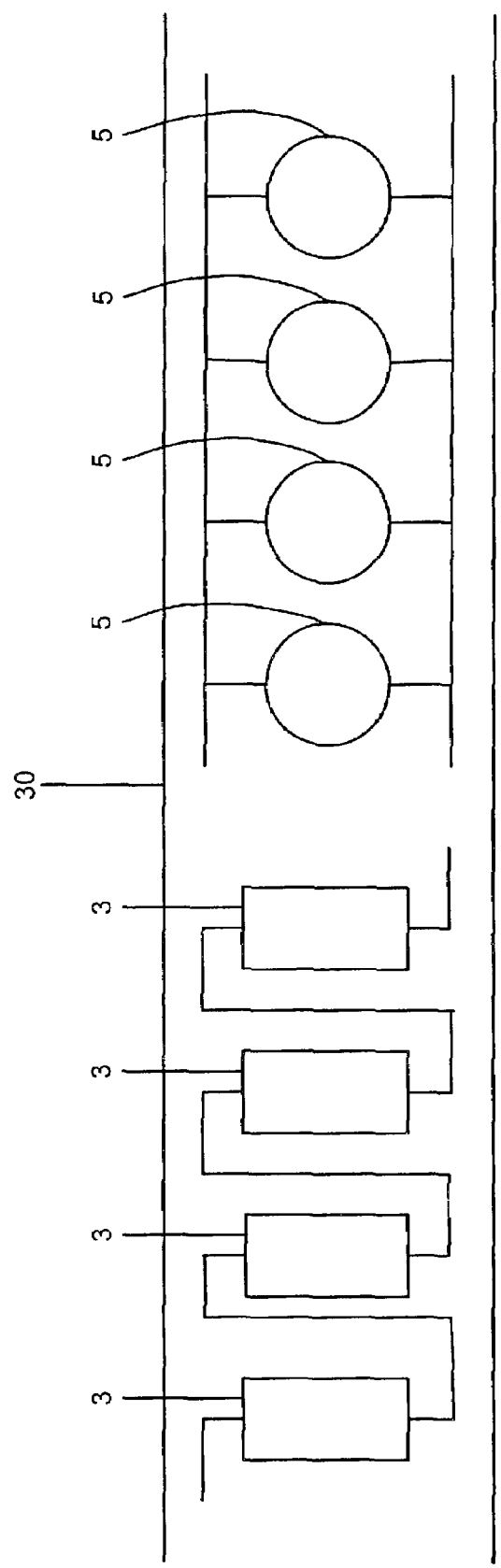
FIG. 5 shows particle velocity sensors and pressure gradient sensors in a seismic streamer cable.

In a particular implementation of the invention, particle velocity sensors 3 and pressure gradient sensors 5 are utilized together in a cylindrical seismic cable 30, as shown in FIG. 5. Use of both particle velocity sensors and pressure gradient sensors enables signal degradation resulting from surface ghost reflections to be substantially eliminated from the recorded seismic data. Such signal improvement is achieved by combining the output signals from a particle velocity sensor (or an array of particle velocity sensors) with the output signal from a pressure gradient sensor (or an array of pressure gradient sensors) positioned at substantially the same location. Particle velocity sensors and pressure gradient sensors positioned at substantially the same location may be referred to hereinafter as "co-located" sensors.

Figure 6A:
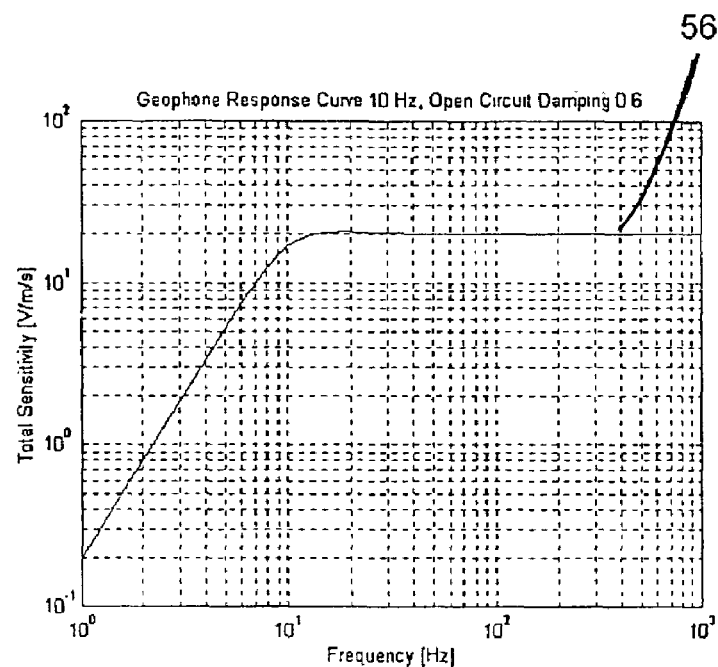
FIGS. 6A and 6B show a typical phase and amplitude response for a particle velocity sensor.
Figure 6B:
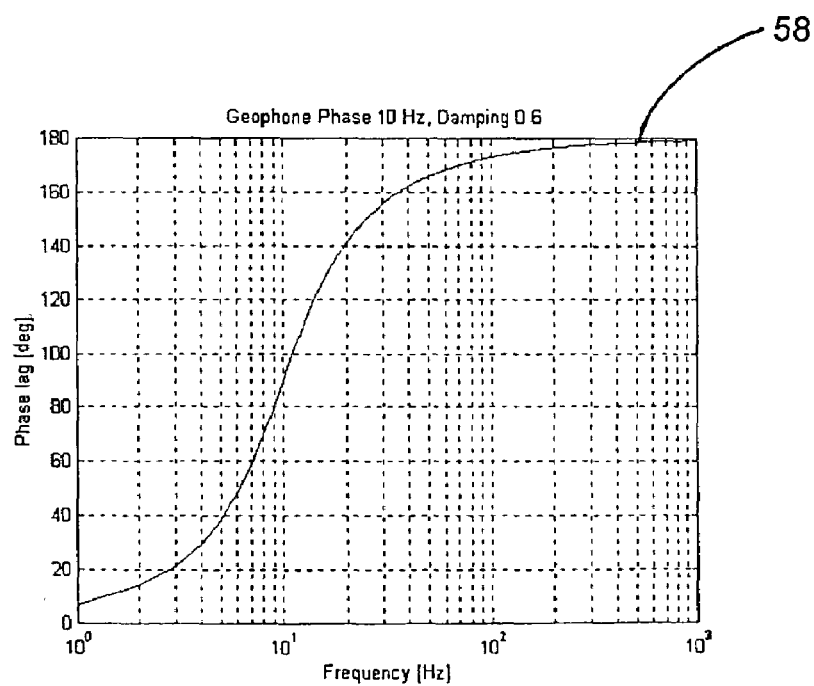

The phase and amplitude response for a pressure gradient sensor are substantially constant in the seismic frequency band of interest (from about 2 Hz. to about 300 Hz.). For example, for the T-2BX hydrophone marketed by Teledyne Instruments, Inc. of 5825 Chimney Rock Road, Houston, Tex. 77081, the variation in amplitude over a frequency range of 2-300 Hz. has been measured at less than 1 db, and the variation in phase at less than 0.1 degree. FIGS. 6A and 6B show a typical amplitude and phase response for a particle velocity sensor. In FIG. 6A, curve 56 represents amplitude variation, and in FIG. 6B, curve 58 represents the phase variation. In contrast to the amplitude and phase response of the hydrophone, it is evident that there are substantial variations in both the amplitude and the phase response for a particle velocity sensor in the seismic frequency range of interest.

Further, in prior art systems, in which the impedance of the particle velocity sensor was not substantially matched to the impedance of the substance (either the water or the water bottom) from which the seismic wave is coupled to the particle velocity sensor, additional variations in amplitude and phase occur in the seismic frequency range because of the impedance mismatch.

In accordance with a particular embodiment of the present invention, where the impedance match between the water and the particle velocity sensor is more nearly equal, such additional variations in amplitude and phase are minimized, and, accordingly, the particle velocity sensor output and the pressure gradient sensor output can be matched by utilizing an appropriate filter, of a type known to those of ordinary skill in the art, without requiring additional matching for variations caused by impedance mismatch.

In one implementation of the invention, the pressure gradient sensor is a hydrophone and the particle velocity sensor is a geophone. The ratio of acoustic pressure in a medium to the associated particle velocity speed is the specific acoustic impedance ($\rho_0 c = p/u$). For a hydrophone, having a good impedance match to the medium surrounding the hydrophone, and having (for example) a pressure sensitivity of 20 volts per bar, i.e., $$H = 20 V/bar, \qquad (Eq.\ 4)$$

which relationship may be expressed as $$H = 20 V/10^5 N/m^2, \qquad (Eq.\ 5)$$

and a geophone or a group of geophones, having a good impedance match to the medium surrounding the geophone, and having (for example) a voltage sensitivity of:

$$G = 20 V/m/s, \qquad (Eq.\ 6)$$

the scale factor (K), expressing the relationship between velocity output signal of the geophone and the pressure output signal of the hydrophone will be:

$$K = \frac{H \cdot \rho_0 c}{G} = \frac{20 \cdot 10^{-5} [V/N/m^2] \cdot 1.5 \cdot 10^6 [Ns/m^3]}{20 [V/m/s]} = 15 \qquad (Eq.\ 7)$$

which indicates that the geophone velocity output signal needs to be multiplied with a scale factor of K=15 before the pressure and the velocity can be compared. It will be understood that for hydrophones and geophones having different sensitivities than in the example discussed above, the scale factor (K) will be different. Further, because of the variation in the amplitude (as shown in FIG. 6A) and phase (as shown in FIG. 6B) of the geophone output as a function of frequency, it is necessary to compensate for the amplitude and phase response of the geophone before applying the scale factor.

The amplitude response (E) and phase response ($\phi$) for the geophone as a function of frequency may be represented by the following relationships:

$$E = \frac{G\left(\frac{f^2}{f_n^2}\right)\left(\frac{R}{r+R}\right)}{\sqrt{\left(1 - \frac{f^2}{f_n^2}\right) + 4 b_t^2 \frac{f^2}{f_n^2}}} \qquad (Eq.\ 8)$$

-continued $$\phi = a\cot\left(\frac{2b_1\frac{f}{f_n}}{1-\frac{f^2}{f_n^2}}\right) \quad \text{(Eq. 9)}$$

in which, G=geophone voltage sensitivity;
f=frequency;
$f_n$=natural resonance frequency;
r=winding resistance;
R=load resistance; and
$b_t$=total damping.

Typical values may be: $f_n$=10; r=350 ohms; R=∞; and $b_t$=0.6.

If the amplitude and phase of the geophone output signal is adjusted to compensate for this variation in phase and amplitude with frequency, the geophone output signal will have substantially the same phase and amplitude curve as the hydrophone signal. Normally the adjustment may be made on the basis of calculations based on Equations 8 and 9.

As stated above, in a preferred embodiment of the invention, particle velocity sensors are constructed to have an acoustic impedance substantially similar to the acoustic impedance of the water in the body of water in which the particle velocity sensors are deployed. Accordingly, problems encountered in prior art system, in which the impedance of the sensor was not matched to the acoustic impedance of the medium from which a seismic wave was coupled to the sensor, are avoided. In prior art systems variations in amplitude and phase as a function of frequency caused by impedance mismatch compounded the difficulty of matching the particle velocity sensor output to the pressure gradient sensor output. Because of the impedance match achieved in a preferred embodiment of the present invention, only the variation in amplitude and phase of the particle velocity sensor itself needs to be compensated for to enable the particle velocity sensor output to be combined with the pressure sensor output to attenuate the spectral notches caused by the ghost reflection.

In a preferred embodiment of the invention, the phase and amplitude variations with frequency of the particle velocity sensor may be calculated based on known (or determinable) characteristics of the particle velocity sensor, itself. The output signal of the particle velocity sensor may be modified accordingly to correct for amplitude and phase variation with frequency using filter techniques well known to those of ordinary skill in the art. For co-located pressure gradient sensors and particle velocity sensors, the signal output of the pressure gradient sensor and the filtered output of the pressure gradient sensor may then be summed to attenuate the spectral notches resulting from the ghost reflection. Although, in a preferred embodiment of the invention, the phase and amplitude of the particle velocity sensor output is modified to substantially match the pressure gradient sensor output, those of ordinary skill in the art would understand that the phase and amplitude of the pressure gradient sensor output could be modified to match the particle velocity sensor output signal.

Figure 7:
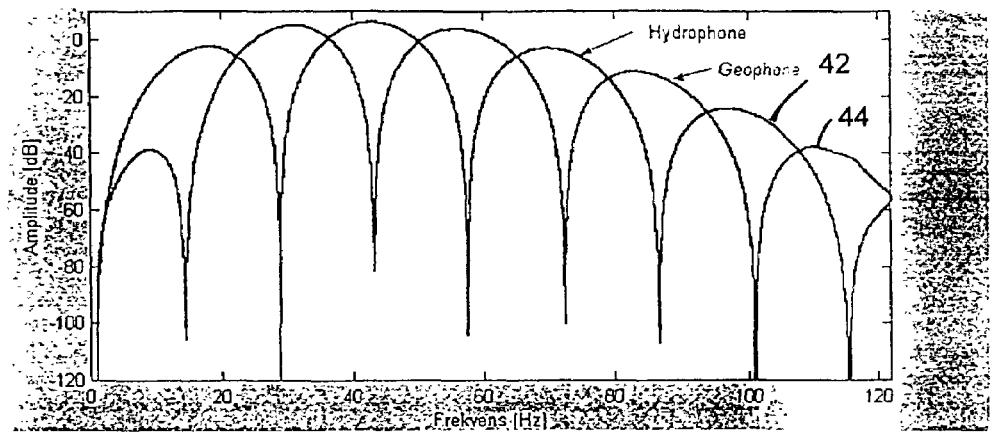
FIG. 7 shows the simulated output responses for a hydrophone and a geophone at a water depth of 26 meters.
Figure 8:
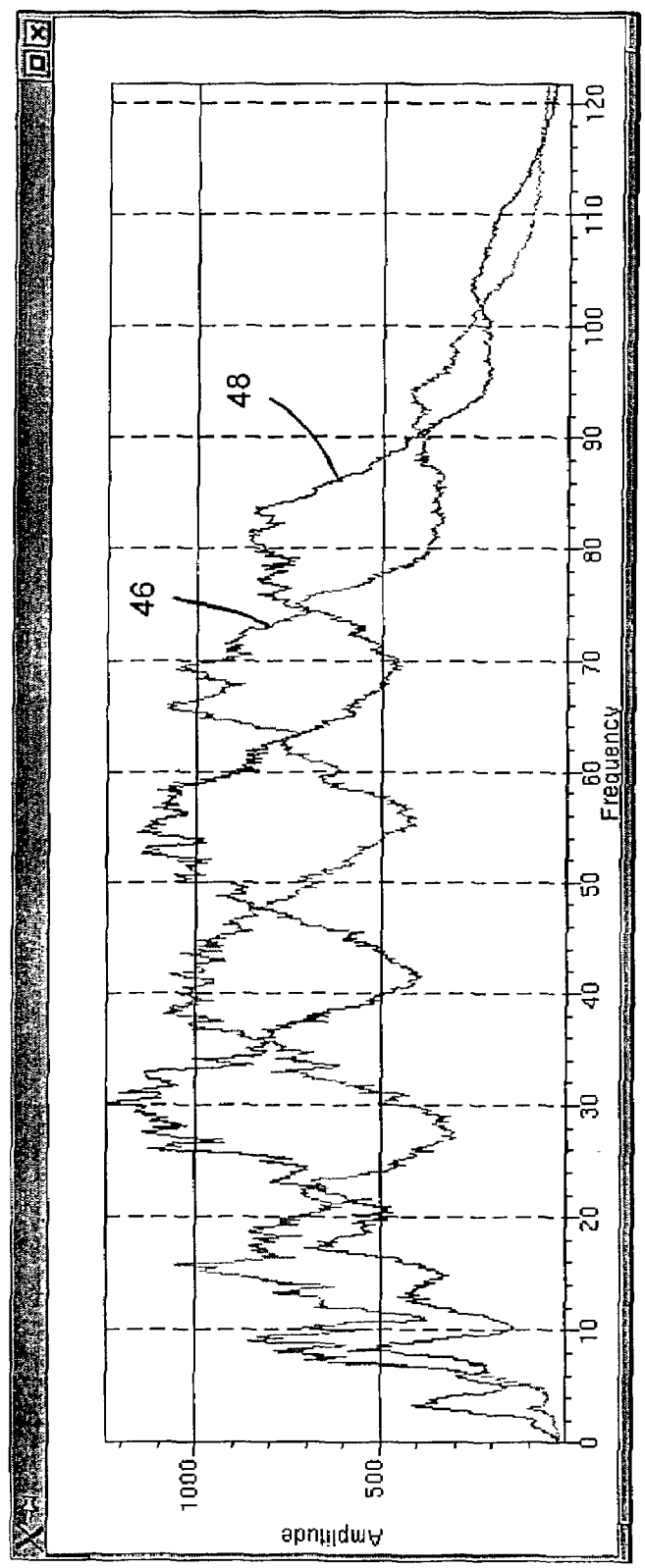
FIG. 8 provides actual hydrophone and geophone data from a field test with the cable at about 26 meters.
Figure 9:
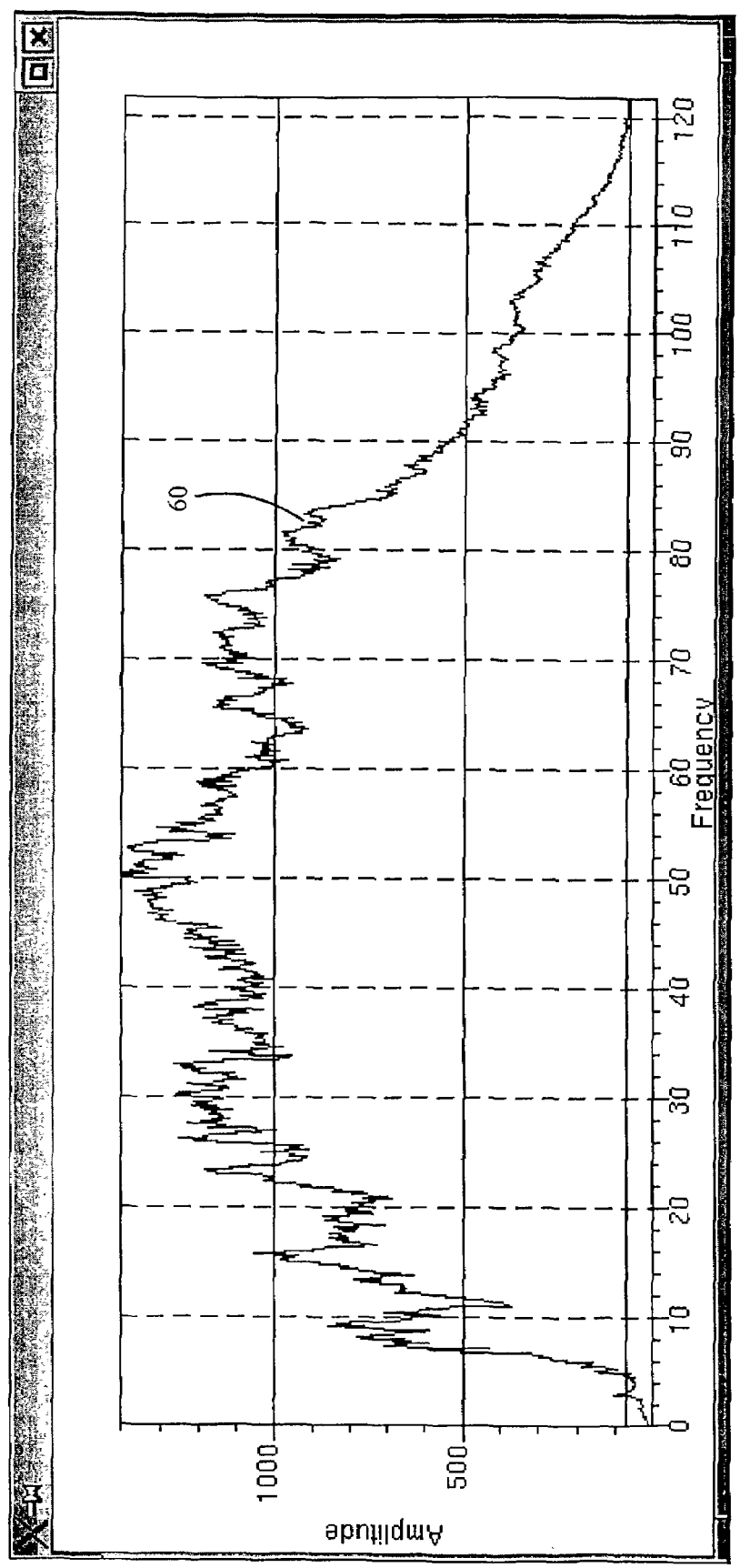
FIG. 9 shows a summation of the hydrophone and geophone data shown in FIG. 8.

Because the noise level is generally greater at shallower water depths, placing the streamer at depths greater than about nine meters (the greatest depth at which streamer cables are typically deployed) may reduce noise detected by the sensors, and the signal to noise ratio of the signals detected by the seismic sensors is accordingly improved. However, for such greater depths, notches in a hydrophone spectrum resulting from the surface ghost reflection are at lower frequencies, and such a hydrophone signal is normally regarded as undesirable because of the spectral notches in the frequency range of interest in seismic exploration. In accordance with an embodiment of the present invention, the output signal from the particle velocity sensor, which will have notches in its frequency spectrum at different frequencies from the notches in the frequency spectrum of the hydrophone, may be combined with the hydrophone output signal to compensates for the notches and a substantially ghost free signal can be obtained. FIG. 7 shows simulated output responses for a hydrophone (curve 42) and a geophone (curve 44) at a water depth of 26-meters. The graph indicates that two signals may be combined to compensate for the spectral notches resulting from the surface reflection. FIG. 8 provides actual data from a field test with the cable at about 26 meters, which confirms the results indicated in the simulation. In FIG. 8 the geophone output signal is designated by numeral 46 and the hydrophone output signal is designated by numeral 48. FIG. 9 shows a summation (curve 60) of the hydrophone and geophone data shown in FIG. 8, and illustrates the attenuation of the spectral notches Because of the potential high noise level in geophone signals at low frequencies, resulting from mechanical vibrations in the cable, in a particular implementation of the invention, low frequency geophone signals are not combined with the hydrophone signal. In one specific implementation of the invention, frequencies in the geophone signal lower than about the frequency of the lowest frequency spectral notch in the hydrophone spectrum are removed from the geophone signal before the geophone signal is combined with the hydrophone signal. In another implementation of the invention, geophone signals of less than about 30 Hz. are not combined with the hydrophone signal.

Improved results are also afforded for operations at shallow depths by the use of particle velocity sensors in seismic cables in addition to pressure gradient sensors, over operations using solely pressure gradient sensors. At shallower depths, i.e., less than about 6 meters, a hydrophone output signal will be attenuated by the surface ghost in the seismic frequency range of interest. Because of the phase difference between the upgoing pressure gradient wavefield and the downgoing pressure gradient wavefield within the seismic frequency band of interest, the downgoing wavefield is subtractive with respect to the upgoing wavefield and the downgoing wavefield effectively attenuates the upgoing wavefield. For a geophone signal, however, the result is the opposite, and the surface ghost signal effectively increases the amplitude of the signal detected by the geophone. The difference in phase between the upgoing wavefield and the downgoing wavefield is such that, for shallow depths, the signal detected by the geophone is additive. Accordingly, substantially improved results are achieved by use of particle velocity sensors in addition to pressure gradient sensors at shallow depths over what is achieved by use of pressure gradient sensors alone. In coastal regions where the water depth is quite shallow, it may be particularly useful to be able to deploy the sensors at such shallower depths.

Figure 10:
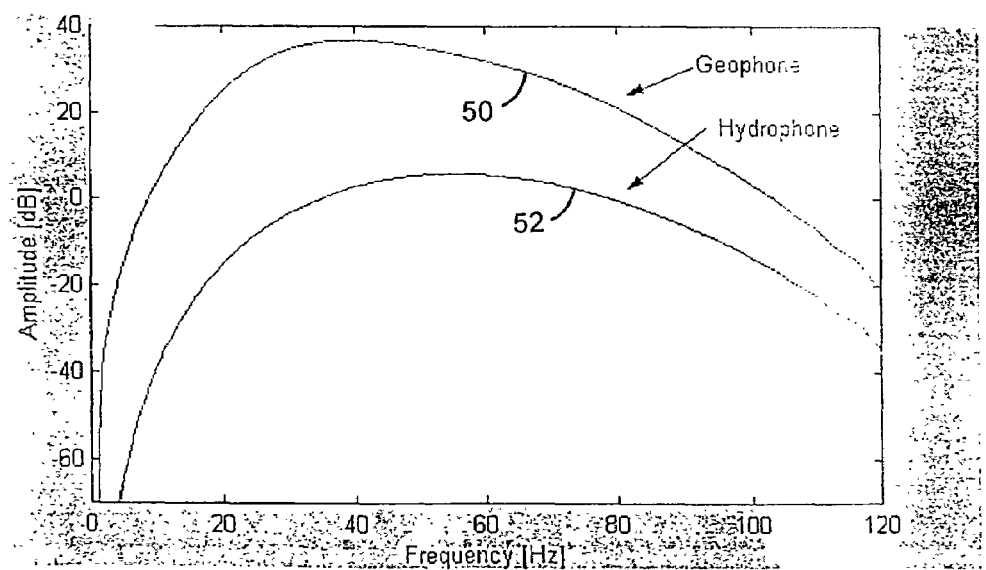
FIG. 10 shows a simulation of streamer data at a one-meter depth.

FIG. 10 shows a simulation of a hydrophone signal (curve 52) and a geophone signal (curve 50) at one-meter depth. The attenuation of the hydrophone signal is evident. Combining the geophone output signal with the hydrophone output signal for data recorded at the one-meter water depth also compensates for the influence from the surface reflection.

Generally, a hydrophone signal will have an amplitude that is 10 to 20 times greater than the amplitude of a geophone signal. This relationship will vary depending on the particular sensitivity of the particular sensors used. Typically a group of hydrophones, distributed across a selected spatial distance, will be connected in parallel for noise attenuation, and the hydrophone output signal that is recorded for use in seismic data processing and analysis is the combined output from a plurality of individual hydrophones connected in parallel. Because of the lower signal amplitude of the geophone output signal, in one implementation of the invention, a group of geophones, associated with a group of hydrophones (co-located geophones and hydrophones), will be connected in series, to increase the amplitude of the output signal as well as to attenuate noise, and the geophone output signal that is recorded for use in seismic data processing and analysis will be the combined output from a plurality of individual geophones connected in series. However, depending on the needs of a particular survey, the geophone groups may be connected in parallel or series, or in a parallel/series combination. Although, in general, the discussion herein refers to an output signal from various sensors, the output signal is typically the output signal from a plurality of discrete sensors interconnected into a sensor array. Further, although the discussion herein generally refers to a geophone and hydrophone, particle velocity sensors other than geophones and pressure gradient sensors other than hydrophones are intended to be within the scope of the present invention.

In one embodiment, groups of about 8 pressure gradient sensors will be used in association with groups of about 2 to about 16 particle velocity sensors (with lower numbers rather than higher numbers of particle velocity sensors preferred), and each combined group will be about 12.5 meters apart from another such combined group. In this embodiment, combined groups of both pressure sensors and particle velocity sensors will be treated as single sensors.

In one embodiment of the invention, three-component particle velocity sensors are included in the seismic cable. By "three-component" is meant that, in addition a particle velocity sensor (typically a geophone) mounted to sense motion in the vertical direction, two particle velocity sensor are mounted in orthogonal directions with respect to each other (and to the vertically mounted geophone) to sense horizontal motion. Accordingly, a three-component particle velocity sensor will sense motion in the vertical direction, in an in-line direction and a cross line direction. Positioning these sensors in these three directions enables the propagation direction of an incoming signal to be detected, and also enables the detection of strumming or other mechanical behavior to the cable.

Accelerometers could be used as particle motion sensor as an alternative to use of geophones, although the output signal will need to be integrated to obtain velocity. An example commercial accelerometer suitable for use in the present invention is the VECTOR-SEIS™, available from Input Output, Inc. in Houston, Tex. This particular accelerometer generates a DC output signal which is indicative of the variation in orientation of the accelerometer from a selected orientation, accordingly, if sets of 2 (for situations in which the in-line direction is known) or 3 (if the in-line direction is not known) of these accelerometers are utilized, the sensor orientation may be computed and it is not necessary to gimbal-mount the accelerometers. A single accelerometer could also be used, but it would need to be gimbal-mounted. Since the sensor can measure acceleration to DC, it is possible to determine the true gravity vector by analyzing the magnitude of G (the gravity vector) each sensor is operable under. The results of this analysis are stored with the trace data as direction cosines and describe the tensor rotation required to recover the signals as if the sensor were deployed at true vertical orientation.

The foregoing description of the invention is intended to be a description of preferred embodiments. Various changes in the described apparatus and method can be made without departing from the intended scope of this invention as defined by the appended claims.

What is claimed is:

1. A particle motion sensor assembly for use in a seismic streamer cable, comprising:
   a housing;
   a particle motion sensor gimbal-mounted in said housing;
   a fluid within said housing substantially surrounding said particle motion sensor, said fluid having a viscosity providing sufficient damping of sensor movement to reduce noise while enabling sufficient movement of said sensor to maintain said sensor in a desired orientation as said housing is rotated;
   wherein said particle motion sensor assembly is constructed from components selected so that said particle motion sensor assembly has an acoustic impedance within the range of about 750,000 Newton seconds per cubic meter to about 3,000,000 Newton seconds per cubic meter; and
   wherein said particle motion sensor assembly has a configuration that enables said particle motion sensor assembly to be mounted within an internal diameter of a seismic streamer cable having an internal diameter no greater than about 66 millimeters.

2. The particle motion sensor assembly of claim 1 wherein the acoustic impedance of said particle motion sensor assembly is substantially equal to the acoustic impedance of sea water.

3. The particle motion sensor assembly of claim 1 wherein said particle motion sensor assembly has a density of less than 2 grams per cubic centimeter.

4. The particle motion sensor assembly of claim 1 wherein said particle motion sensor assembly has a density equal to about 1 gram per cubic centimeter.

5. The particle motion sensor assembly of claim 1 wherein said particle motion sensor assembly has a density substantially equal to the density of seawater.

6. The particle motion sensor assembly of claim 1 wherein said fluid has a viscosity greater than about 500 centistokes and less than about 5000 centistokes.

7. The particle motion sensor assembly of claim 1 wherein said configuration that enables said particle motion sensor to be mounted within an internal diameter of a seismic streamer cable having an internal diameter no greater than about 66 millimeters comprises electrical conductors coupled to said particle motion sensor for conveying particle motion sensor output signals to the exterior of said housing, each electrical conductor comprising an electrically conductive spring in electrical communication with said particle motion sensor.

8. The particle motion sensor assembly of claim 1 wherein the internal diameter of said seismic streamer cable is about 55 millimeters.

9. The particle motion sensor assembly of claim 1 wherein the internal diameter of said seismic streamer cable is about 66 millimeters.

10. A seismic sensor streamer having an internal diameter no greater than about 66 millimeters, comprising:
a plurality of pressure gradient sensors disposed at spaced apart locations along a streamer cable; the streamer cable adapted to be towed behind a vessel through a body of water at a selected depth below the water surface, and
a plurality of particle motion sensor assemblies, each particle motion sensor assembly substantially collocated with one of the pressure gradient sensors, each particle motion sensor assembly comprising a housing, a particle motion sensor gimbal-mounted in said housing, a fluid within said housing substantially surrounding said particle motion sensor, said fluid having a viscosity providing sufficient damping of sensor movement to reduce noise while enabling sufficient movement of said particle motion sensor to maintain said particle motion sensor in a desired orientation as said streamer and housing are rotated, and wherein said particle motion sensor assembly has an acoustic impedance within the range of about 750,000 Newton seconds per cubic meter to about 3,000,000 Newton seconds per cubic meter, and wherein the dimensions of said particle motion sensor assembly are adapted for mounting within an internal diameter of said seismic streamer cable having an internal diameter no greater than about 66 millimeters.

11. The streamer of claim 10 wherein the acoustic impedance of each of the particle motion sensor assemblies is substantially equal to the acoustic impedance of sea water.

12. The streamer of claim 10 wherein each of the particle motion sensor assemblies has a density of less than 2 grams per cubic centimeter.

13. The streamer of claim 10 wherein each of the particle motion sensor assemblies has a density equal to about 1 gram per cubic centimeter.

14. The streamer of claim 10 wherein each of the particle motion sensor assemblies has a density substantially equal to the density of seawater.

15. The streamer of claim 10 wherein said fluid has a viscosity greater than about 500 centistokes and less than about 5000 centistokes.

16. The streamer of claim 10 wherein said configuration that enables said particle motion sensor to be mounted within an internal diameter of a seismic streamer cable having an internal diameter no greater than about 66 millimeters comprises electrical conductors coupled to each of the particle motion sensors for conveying particle motion sensor output signals to the exterior of the respective housing, each electrical conductor comprising an electrically conductive spring in electrical communication with the respective particle motion sensor.

17. The streamer of claim 10 wherein an internal diameter of said seismic streamer cable is about 55 millimeters.

18. The streamer of claim 10 wherein an internal diameter of said seismic streamer cable is about 66 millimeters.

* * * * *